(12) United States Patent
Jain et al.

(10) Patent No.: US 7,770,121 B2
(45) Date of Patent: Aug. 3, 2010

(54) HOST CONTROLLED USER INTERFACE

(75) Inventors: Manoj Jain, Hyderbad (IN); Archan Das, Hyderbad (IN)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 11/786,511

(22) Filed: Apr. 12, 2007

(65) Prior Publication Data
US 2008/0256469 A1 Oct. 16, 2008

(51) Int. Cl.
G06F 3/00 (2006.01)
(52) U.S. Cl. .................... 715/744; 715/762; 715/746; 715/763; 715/825; 717/107; 717/108; 717/109; 717/113
(58) Field of Classification Search .................. 715/744, 715/746, 762, 763, 764, 765, 802, 825, 826; 717/107, 108, 109, 113
See application file for complete search history.

(56) References Cited

U.S. PATENT DOCUMENTS

| | | | |
|---|---|---|---|
| 5,640,579 A | 6/1997 | Koppolu et al. | |
| 5,673,401 A * | 9/1997 | Volk et al. .................. | 725/139 |
| 6,021,418 A | 2/2000 | Brandt et al. | |
| 6,247,020 B1 | 6/2001 | Minard | |
| 6,252,592 B1 * | 6/2001 | King et al. .................. | 715/764 |
| 6,342,907 B1 | 1/2002 | Petty et al. | |
| 6,427,230 B1 * | 7/2002 | Goiffon et al. ............. | 717/108 |
| 6,964,034 B1 | 11/2005 | Snow | |
| 7,111,243 B1 * | 9/2006 | Ballard et al. .............. | 715/744 |
| 7,506,273 B2 * | 3/2009 | Lahiri ........................ | 715/854 |
| 2004/0027376 A1 | 2/2004 | Calder et al. | |
| 2005/0091641 A1 | 4/2005 | Starbuck et al. | |
| 2005/0149206 A1 | 7/2005 | Krane | |
| 2005/0172237 A1 * | 8/2005 | Cragun et al. .............. | 715/744 |
| 2005/0268277 A1 | 12/2005 | Reeder et al. | |
| 2006/0036726 A1 | 2/2006 | Fabbio et al. | |
| 2006/0161859 A1 | 7/2006 | Holecek et al. | |
| 2006/0236328 A1 * | 10/2006 | DeWitt ....................... | 719/329 |
| 2007/0180386 A1 * | 8/2007 | Ballard et al. .............. | 715/744 |

OTHER PUBLICATIONS

Kubalski, et al., "Object Works Interaction Model-Integrating Multiple Views", Date: 1993, http://ieeexplore.ieee.org/xpl/freeabs_all.jsp?arnumber=388410.
Reiss, Steven P., "PECAN: Program Development Systems That Support Multiple Views", Date: 1984, http://delivery.acm.org/10.1145/810000/801988/p324-reiss.pdf?key1=801988&key2=6524797611&coll=GUIDE&dl=GUIDE&CFID=8354933&CFTOKEN=54441509.
Furtado, et al., "An Ontology-Based Method for Universal Design of User Interfaces", in Proceedings of Workshop on Multiple User Interfaces over the Internet: Engineering and Applications Trends, Sep. 2001.
Roth, et al., "Visage: A User Interface Environment for Exploring Information" in Proceedings of the IEEE Symposium on Information Visualization, Oct. 1996.

* cited by examiner

Primary Examiner—Weilun Lo
Assistant Examiner—Rashedul Hassan

(57) ABSTRACT

Described herein is technology for, among other things, a graphical user interface. The graphical user interface is made up of multiple user interface components. The multiple user interface components are hosted by a host user interface, which encapsulates and exposes the user interface components together to present a unified view of the user interface components as a single user interface. Moreover, the host user interface presents the capabilities of the user interface components as a whole.

20 Claims, 6 Drawing Sheets

HOST CONTROLLED USER INTERFACE

BACKGROUND

A single graphical user interface (GUI), such as the main window of an email client, typically includes several user interface (UI) components. The components may include various menu bars, toolbars, folder trees, text boxes, etc. Most GUIs are monolithic in that all the components of a particular UI are built on the same UI technology and then compiled together as one single piece of code. The result is that the components of the UI are dependent on one another.

This dependency between UI components in a monolithic GUI creates difficulties from a maintenance perspective. For example, if a developer wishes to enhance the GUI by updating a UI component, the code for the GUI must be rewritten and recompiled. Similarly, adding or removing a UI component also requires that the code be rewritten and recompiled. In other words, monolithic GUIs are not pluggable with respect to UI components. Additionally, UI components in monolithic GUIs are not portable in the sense that a UI component of one monolithic GUI cannot be reused by another monolithic GUI that is built on a different UI technology. Moreover, even if a component UI is built on the same technology as another monolithic UI, the component UI may still not be reusable in the other monolithic UI due to a design difference in the component UI that makes it incompatible.

Thus, all the UI components of a monolithic UI need to be built on the same technology with the same fundamental design. Conventional GUI mechanisms do not allow gradation of UI controls without affecting other modules or UI components within the same GUI.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, a graphical user interface. The graphical user interface is made up of multiple user interface components. The multiple user interface components are hosted by a host user interface, which encapsulates and exposes the user interface components together to present a unified view of the user interface components as a single user interface. Moreover, the host user interface presents the capabilities of the user interface components as a whole. In one embodiment, at least one of the user interface components is based on a different user interface design than another user interface component.

Thus, embodiments provide technology that allows for a single user interface to host UI components that are built on different designs. This greatly simplifies the UI development process because it allows for a UI component to be added, removed, or changed in a graphical user interface without having to recode or recompile the entire GUI. In addition, a UI component may be reused by multiple graphical user interfaces, regardless of its design. Thus, as result of the present technology, UI code is more portable and modular. Moreover, the present host control technology allows for graphical user interfaces to be dynamic. For example, embodiments allow for the presentation of additional UIs in response to a user action, or UI components may be dynamically resized in order to accommodate additional UI components.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
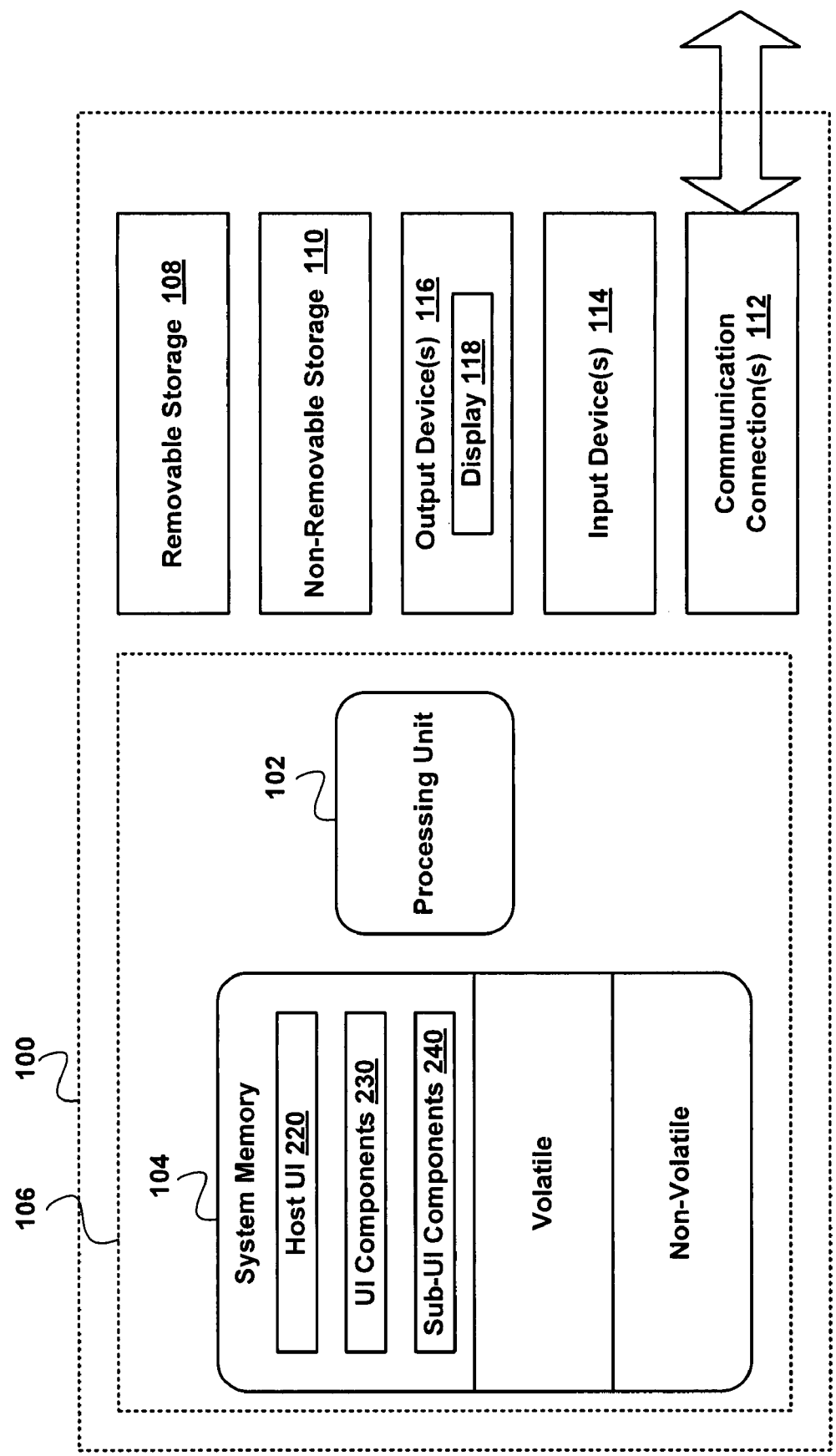
FIG. 1 illustrates a block diagram of an exemplary operating environment upon which embodiments may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Overview

Briefly stated, embodiments provide for a hosted user interface (UI) such that UI components built on different designs may function together in a unified graphical user interface. However, it should be appreciated that embodiments may also be used in cases where UI components are built on the same design. As used herein, "different designs" may involve different programming languages (e.g., Visual Basic versus C++), different UI technologies within a programming language (e.g., Microsoft Foundation Class versus Win32), or incompatible internal designs within a technology. By adding a host UI layer between the UI components and the actual display, UI components that are built on different designs can be stitched together by the host UI and presented as a fully integrated and unified UI.

Exemplary Operating Environment, in Accordance with an Embodiment

With reference to FIG. 1, an exemplary system for implementing embodiments includes a general purpose computing system environment, such as computing system environment 100. In its most basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This most basic configuration is illustrated in FIG. 1 by dashed line 106. Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and nonremovable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 100 may also have input device(s) 114 such as a keyboard, mouse, pen, voice input device, touch input device, etc. Output device(s) 116 such as a display 118 that is suitable for displaying a graphical user interface may also be included. The output devices(s) 116 may also include speakers, printer, etc. All these devices are well known in the art and need not be discussed at length here.

In one embodiment, system memory 104 includes computer-executable modules/components for a host UI 220, UI components 230, and sub-UI components 240. In an exemplary embodiment, components 220, 230, and 240 function together to provide a host control system for presenting an integrated user interface.

Embodiments are described in terms of these example environments. Description in these terms is provided for convenience only. It is not intended that the embodiments be limited to application in this example environment. In fact, after reading the following description, it will become apparent to a person skilled in the relevant art how to implement alternative embodiments.

Exemplary Host Control System, in Accordance with an Embodiment

Figure 2:
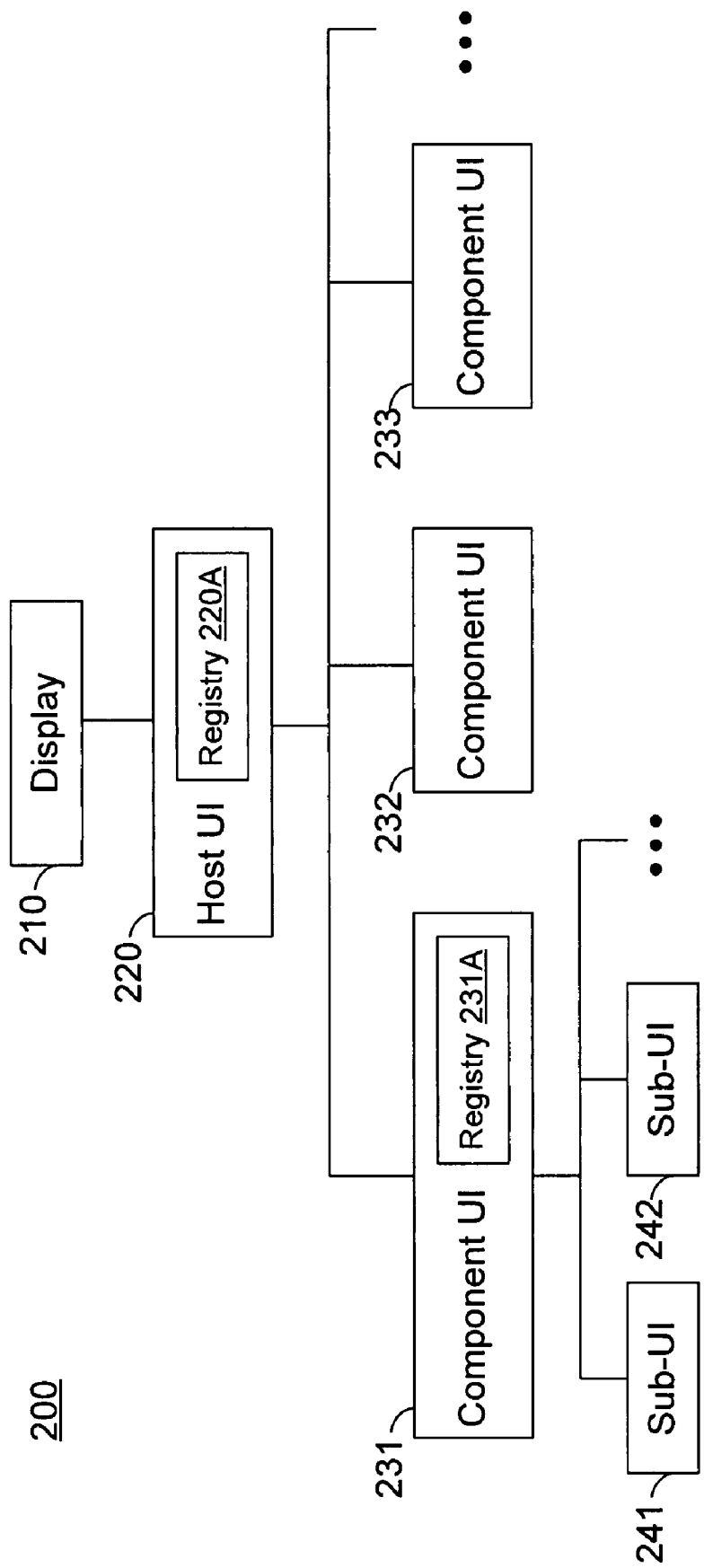
FIG. 2 illustrates a block diagram for a host control system, in accordance with various embodiments.

FIG. 2 illustrates a block diagram for a host control system 200, in accordance with various embodiments. The host control system 200 is operable to interface with a display device 118. The host control system 200 includes a number of UI components 231-233. In one embodiment, at least one of the UI components (e.g., UI component 231) is built on a different design than another UI component (e.g., UI component 232). As used herein, "different designs" may involve different programming languages (e.g., Visual Basic, Avalon, C++, etc.), different UI technologies within a programming language (e.g., Microsoft Foundation Class, non-Microsoft Foundation Class, Win32), or incompatible internal designs within a technology.

The host control system 200 also includes a host UI 220. In essence, the host UI 220 serves as an intermediate layer between the various UI components 231-233 and the display 118. In other words, the host UI 220 is operable to interface with the UI components 231-233 and, despite any design differences that may exist between the UI components 231-233, present the UI components 231-233 together as a single integrated UI.

It should be appreciated that host control system 200 as illustrated in FIG. 2 resembles a tree structure, with the host UI 220 serving as a parent node for the child nodes corresponding to the UI components 231-233. Similarly each UI component (e.g., UI component 231) may serve as a parent node (or "sub-host") for child nodes corresponding to sub-UI components (e.g., sub-UI components 241-242) that compose the parent UI component (e.g., UI component 231). For example, UI component 231 may have sub-UI components 241-242. Moreover, sub-UI component 241 may be built on a different design than sub-UI component 242. In such a case, the UI component 231 is operable to interface with the sub-UI components 241-242 and present them as a single integrated sub-UI to the host UI 220. Subsequently, the host UI 220 may then interface with UI component 231 and the other UI components 232-233 and present them, including any of their sub-UI interfaces 241-242, together as a single integrated UI.

In one embodiment, the host UI 220 includes a registry 220A, which the host UI 220 is operable to analyze to determine which UI components are registered with the host UI 220 and therefore need to be included in the integrated UI. Similarly, UI component 231, which has sub-UI components 241-242, may also have a corresponding registry 231A with which sub-UI components 241-242 may register. A registry system eliminates having to hard code the identification of the various UI components 231-233 into the host UI 220. Consequently, and beneficially, the list of UI components that a particular host UI 220 hosts can be a dynamic list, such that UI components can be added or removed without requiring that the host UI 220 or other UI components 231-233 be recompiled. For example, in one embodiment, adding a new UI component to the integrated UI involves simply registering the new UI component with the host UI 220. Thereafter, the next time the host UI 220 initializes, it will analyze the registry 220A and determine that it needs to initialize the new UI component. Conversely, a UI component may just as easily be removed by unregistering the UI component with the host UI 220. This concept of hosted UIs and UI registration is very attractive from a developmental standpoint in that a developer can fine-tune individual UI components without having to recode and recompile the entire graphical user interface. Thus, a "final version" of a graphical user interface can be released. Subsequently, an enhancement to the graphical user interface (such as a new toolbar) can be added without having to recode the entire graphical user interface.

Moreover, the host UI 220 can also add or remove UI components 231-233 "on-the-fly." For example, a new button, toolbar, etc., may need to be displayed in response to a user action. In such a case, the host UI 220 is operable to create an instance of the new component UI. As a part of initializing the new component UI, the host UI 220 is operable, if necessary, to resize existing components 231-233 in order to accommodate the new component UI.

Figure 3:
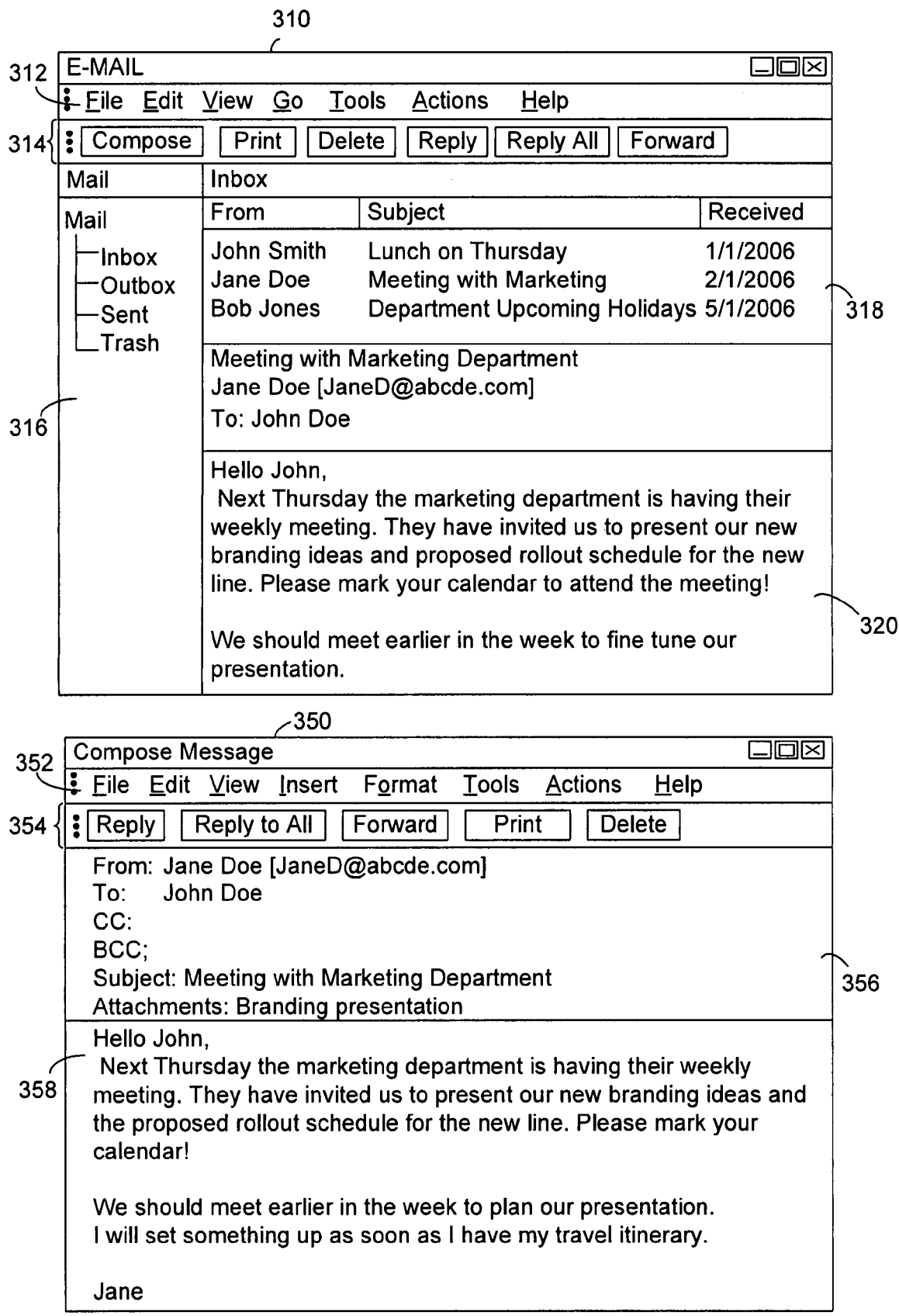
FIG. 3 illustrates an example graphical user interface layout for an e-mail client window and a corresponding e-mail composition window, in accordance with an embodiment.

For purposes of illustration, and not for limitation, FIG. 3 illustrates an example graphical user interface layout for an e-mail client window 310 and a corresponding e-mail composition window 350. FIG. 3 illustrates that a single graphical user interface, such as e-mail client window 310, may include several different types of UI components. For example, the e-mail client window 310 includes a menu bar 312, a toolbar 314 of one or more buttons, a tree structure folder view 316, an e-mail list pane 318, a message preview pane 320, etc. Conventionally, these various components would all be coded together in a single block of code. Thus, any type of customization, such as adding or removing buttons or moving a toolbar must be hard-coded ahead of time.

Alternatively, the e-mail client window 310 may be implemented as a hosted UI such as host control system 200. In such a case, the primary window 310 may serve as a host UI 220. The primary window 310 may then host UI components such as menu bar 312, toolbar 314, etc. As above, these UI components need not be built on the same design. For example, the menu bar 312 may be built in Microsoft Visual Basic, whereas the toolbar 314 may be built in C++. Furthermore, the toolbar 314 may host the various buttons of toolbar 314 as sub-UI components. Thus, when the e-mail client window 310 initially loads, it may thereby initialize the UI components of the menu bar 312, the toolbar 314, the folder view 316, etc. Similarly, when the toolbar 314 initializes, it may in turn initialize its sub-UI components (i.e., buttons).

Similar to the e-mail client window 310, the e-mail composition window 350 may comprise several UI components, such as a menu bar 352, a toolbar 354, a message header section 356, and a message preview pane 358. It should be appreciated that the content of message preview pane 320 and a message preview pane 358 are substantially the same. However, conventional monolithic UIs have no means of reusing the message preview pane 320, for example, in the message composition window 350 as message preview pane 358. Instead, the two similar UI components must be separately coded. This may be due to the fact the windows 310 and 350 were conventionally built on different designs. For example, the e-mail client window 310 may be built on Microsoft Foundation Classes (MFC), while the e-mail composition window 350 may be built on non-MFC code.

If the windows 310 and 350 were implemented in host control systems such as host control system 200, the same UI component that is used to provide the message preview pane 320 in the e-mail client window 310 may then be used to provide the message preview pane 358 in the e-mail composition window 350. In this example, the host UI 220 for the e-mail composition window 350 may be used to host the MFC control for the message preview pane 320 in the otherwise non-MFC e-mail composition window 350.

In host control system 200, certain operations such as searching and cycling focus through various UI components (i.e., "tabbing") may continue to be utilized despite the fact that the integrated user interface may be non-monolithic. Such operations may be implemented a number of ways.

In the case of tabbing, for example, the UI components 231-233 upon initialization may each create a "tab stop array" of all tab-able controls in the child items. In the case of UI component 231, which has sub-UI components 241-242, the sub-UI components 241-242 may each create their own tab stop arrays and then pass them up to the UI component 231. The UI component 231 may then merge the tab stop arrays from sub-UI component 241 and sub-UI component 242 with an array of its own tab-able controls. Similarly, the UI components 231-233 then pass their respective tab stop arrays up to the host UI 220, which creates a master tab stop array from these arrays. Thus, the host UI 220 is able to determine the succession of tab-able commands based on the master tab stop array.

Alternatively, tabbing may be implemented as a recursive function on the UI components 231-233. For example, the host UI 220 may call a "TabToNextItem" function on the UI component corresponding to an item that is currently in focus. If the UI component is able to handle the call (i.e., the UI component has another tab-able item in succession to the current item), the UI component updates the focus to the next tab-able item and indicates to the host UI 220 that the call has been handled. If the UI component is not able to handle the call (i.e., the tab-able item currently in focus is the last tab-able item of the UI component), the UI component indicates to the host that the call is not handled. Thereafter, the host UI 220 may call TabToNextItem on the next UI component, and so on, until the call is successfully handled. Similarly, if the call is passed to UI component 231, for instance, UI component 231 may in turn successively call TabToNextItem on its sub-UI components. Handling tabbing recursively is advantageous in that a tab stop array does not need to be rebuilt if, for example, a UI component is repositioned or when a UI component is changed by splitting a control into multiple controls dynamically.

In one embodiment, string searches may be implemented recursively in the host control system 200, similar to tabbing. In other words, if a search for a string is requested, the host UI 220 may then call the search on the UI components 231-233, which in turn may call the search on any sub-UI components 241-242, and so on. The search results may be returned in any of the number of ways known in the art.

Such recursive mechanisms for tabbing, searching, and the like, allow for the preservation of the functionality when UI components are added, removed, repositioned, etc., without requiring that any other components be recompiled.

Exemplary Host Control Operations, in Accordance with an Embodiment

The following discussion sets forth in detail the operation of present technology for presenting an integrated UI. With reference to FIGS. 4-8, flowcharts 400, 430A, 450A, 480A, and 480B each illustrate example operations used by various embodiments of the present technology for presenting an integrated UI. Flowcharts 400, 430A, 450A, 480A, and 480B include processes that, in various embodiments, are carried out by a processor under the control of computer-readable and computer-executable instructions. The computer-readable and computer-executable instructions reside, for example, in data storage features such as computer usable memory 104, removable storage 108, and/or non-removable storage 110 of FIG. 1. The computer-readable and computer-executable instructions are used to control or operate in conjunction with, for example, processing unit 102 of FIG. 1. Although specific operations are disclosed in flowcharts 400, 430A, 450A, 480A, and 480B, such operations are examples. That is, embodiments are well suited to performing various other operations or variations of the operations recited in flowcharts 400, 430A, 450A, 480A, and 480B. It is appreciated that the operations in flowcharts 400, 430A, 450A, 480A, and 480B may be performed in an order different than presented, and that not all of the operations in flowcharts 400, 430A, 450A, 480A, and 480B may be performed.

Figure 4:
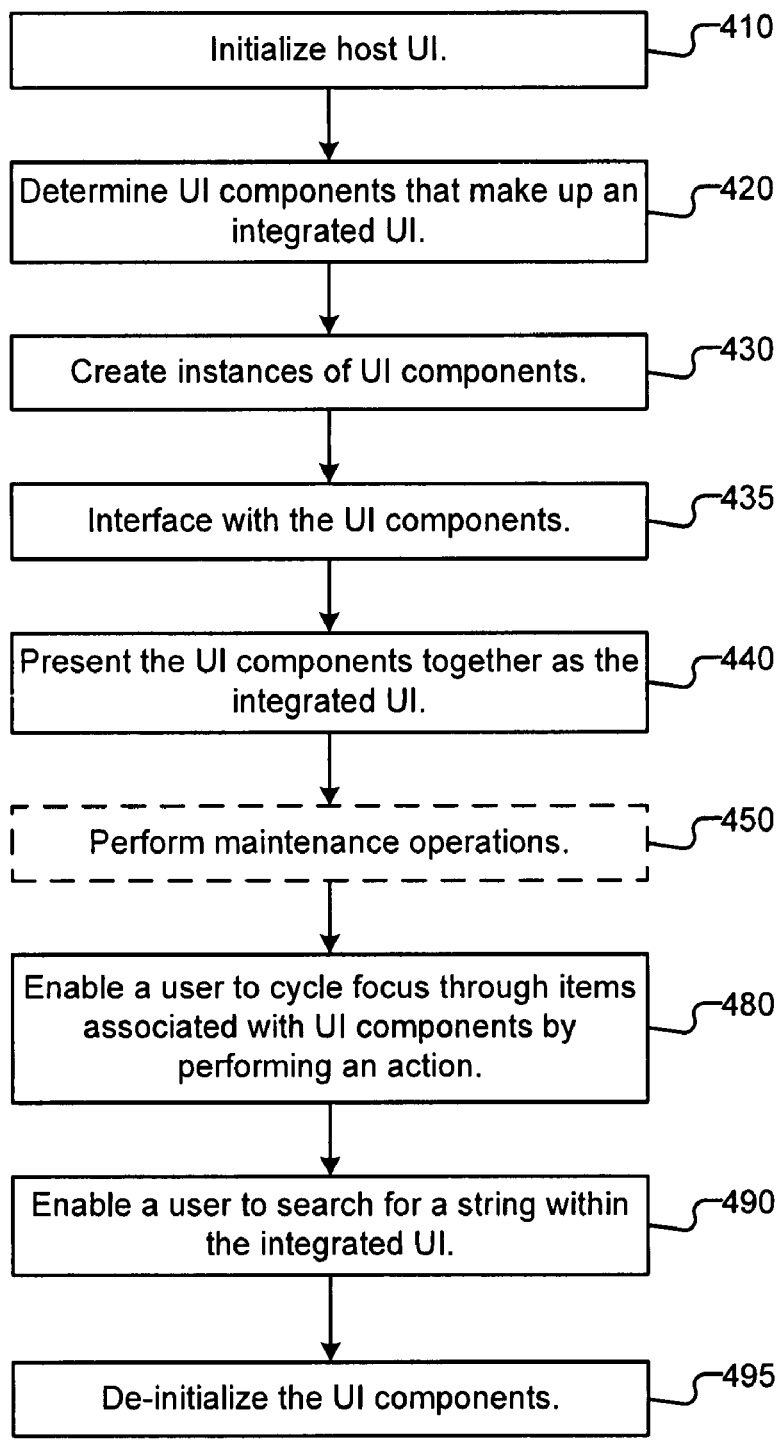
FIG. 4 illustrates a flowchart of a process for providing an integrated user interface, in accordance with various embodiments.

FIG. 4 illustrates a flowchart 400 of a process for providing an integrated user interface, in accordance with various embodiments. At block 410, a host UI is initialized. The host UI may serve as an interface or intermediate layer between a display and UI components of the integrated UI. In doing so, the host UI enables the capability to integrate various UI components. In one embodiment, the UI components are built on different designs. These capabilities allow for the realization of several benefits, as described above. At block 420, the UI components that make up the integrated UI are determined. It should be appreciated that this may be achieved a number of ways. For example, in one embodiment, the UI components that are part of the integrated UI are registered in a registry. Thus, the registry can be analyzed to determine which UI components make up the integrated UI.

Figure 5:
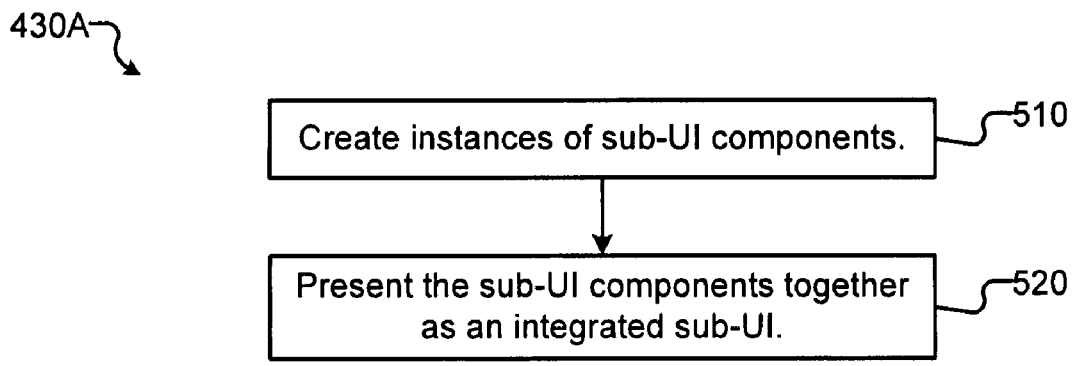
FIG. 5 illustrates a flowchart of a process for initializing a UI component having sub-UI components, in accordance with various embodiments.

Once the UI components are determined, instances of the UI components are created (block 430). It should be appreciated that the hierarchy of UI components is not limited to a two-tier system. For example, a particular UI component may encompass several sub-UI components, which may in turn encompass sub-UI components of their own, and so on. As such, creating an instance of a UI component may involve creating instances of sub-UI components. FIG. 5 illustrates a flowchart 430A of a process for initializing a UI component having sub-UI components, in accordance with various embodiments. At block 510, instances of the sub-UI components are created. At block 520, the sub-UI components are presented together as an integrated sub-UI to the parent UI component.

With reference again to FIG. 4, block 435 involves interfacing with the UI components. Block 440 involves presenting the UI components together as the integrated UI. In one embodiment, the operations of blocks 435 and 440 are performed by the host UI, which is able to access and control the UI components through a particular interface.

Figure 6:
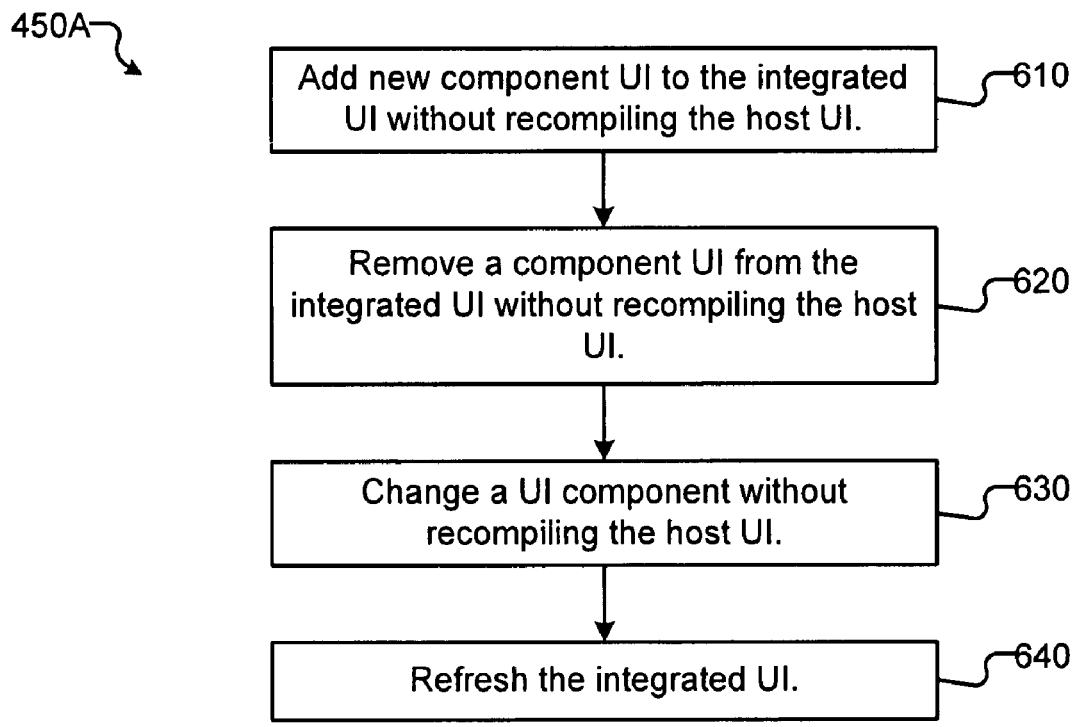
FIG. 6 illustrates a flowchart for a process for performing maintenance operations, in accordance with various embodiments of the present invention.

In one embodiment, maintenance operations may be optionally run in the background (block 450) to update the integrated UI. FIG. 6 illustrates a flowchart 450A for a process for performing maintenance operations, in accordance with various embodiments of the present invention. At block 610, a new UI component may be added to the integrated UI without recompiling the host UI. In one embodiment, this may involve registering the new component in a registry. In another embodiment, this may involve adding a previously dormant component UI to the integrated UI in response to a user action (e.g., clicking a particular button). It should be appreciated that a component UI may similarly be removed from the integrated UI (block 620). Furthermore, a component UI may be changed without recompiling the host UI (block 630). In other words, a developer may modify a single UI component that forms a part of a larger integrated UI, and because of the host UI interface, it is therefore not necessary to recompile either the host UI or any other UI components. In essence, UI components consequently become "pluggable." At block 640, the integrated UI is then refreshed to incorporate any modifications made in blocks 610-630.

Figure 7:
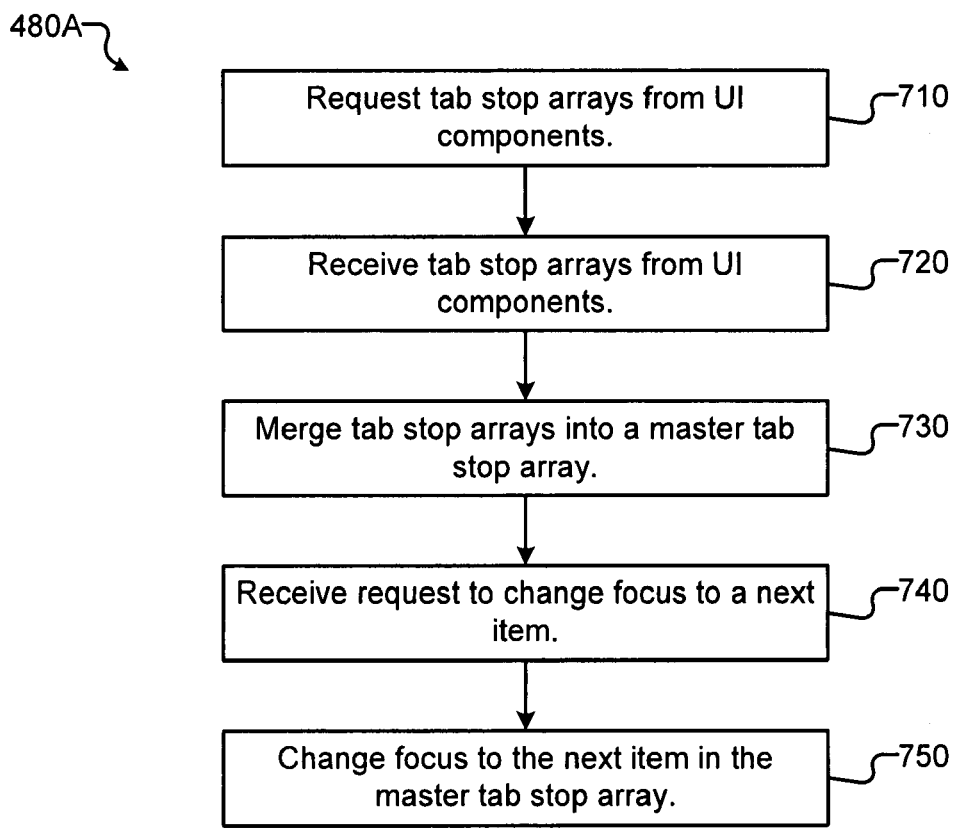
FIG. 7 illustrates a flowchart of a process for cycling focus through items associated with UI components, in accordance with various embodiments.

Despite the fact that embodiments may implement non-monolithic UI architecture, embodiments are still able to maintain conventional monolithic functionality, such as tabbing and searching. For example, and with reference again to FIG. 4, block 480 involves enabling a user to cycle focus through items associated with UI components by performing an action (such as tabbing). FIG. 7 illustrates a flowchart 480A of a process for cycling focus through items associated with UI components, in accordance with various embodiments. At block 710, tab stop arrays of tab-able controls are requested from UI components. It should be appreciated that this may be a recursive operation in a case where a particular UI component encompasses sub-UI components. At block 720, the tab stop arrays are received from the UI components the multiple tab stop arrays of the UI components are then merged into a master Stop array (block 730). Subsequently, when a request to change focus to a next item is received (block 740), such as when a tab command is entered, the focus may then be changed to the next item in the master tab stop array (block 750).

Figure 8:
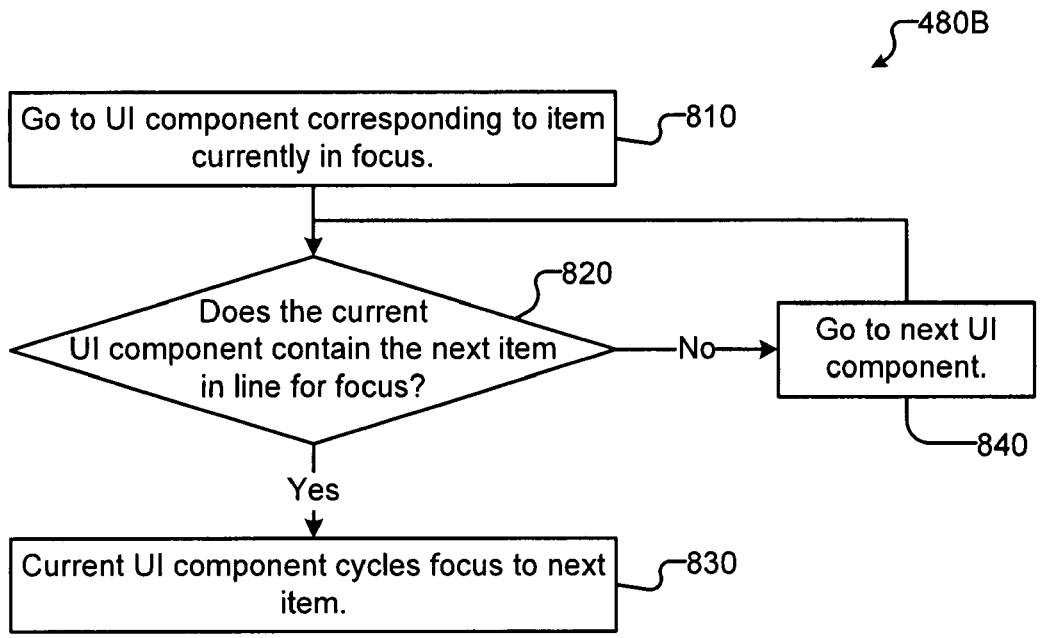
FIG. 8 illustrates a flowchart of another process for cycling focus through items associated with UI components, in accordance with various embodiments.

Alternatively, FIG. 8 illustrates a flowchart 480B of another process for cycling focus through items associated with UI components, in accordance with various embodiments. Initially, the UI component corresponding to an item currently in focus is accessed, for example, by the host UI (block 810). At block 820, a determination is made as to whether the current UI component being accessed contains the next item in line for focus. For example, with reference to FIG. 3, if the "Reply All" button of toolbar 314 is currently in focus, then the toolbar 314 contains the next item in line (i.e., the "Forward" button). If the current UI component does contain the next item in line for focus, the current UI component then cycles focus to the next item (block 830). Thus, toolbar 314 would cycle focus from the Reply All button to the Forward button. On the other hand, if the Forward button (i.e., the last button) of toolbar 314 is currently in focus, then the toolbar 314 does not contain the next item in line. If the current UI component does not contain the next item in line for focus, the next UI component (e.g., folder list 316) is accessed (block 840). Block 820 and 840 may be repeated as necessary until the next item in line is brought to focus. It should be appreciated that if a UI component further contains sub-UI components, operations similar to those in flowchart 480A may be performed with respect to sub-UI components.

With reference again to FIG. 4, block 490 involves enabling a user to search for a string within the integrated UI. This may involve, for example, recursively calling a search on the UI components and any sub-UI components. In response, the results may be returned by the UI components and the sub UI components to the host UI.

At block 495, the UI components (and sub-UI components) may be de-initialized. This may involve, for example the host UI calling a recursive shutdown routine on each of the UI components.

Thus, embodiments provide technology that allows for a single user interface to host UI components that are built on different designs. This greatly simplifies the UI development process because it allows for a UI component to be added, removed, or changed in a graphical user interface without having to recode or recompile the entire graphical user interface. In addition, a UI component may be reused by multiple graphical user interfaces, regardless of its design. Thus, as result of the present technology, UI code is more portable and modular. Moreover, the present host control technology allows for graphical user interfaces to be dynamic. For example, embodiments allow for the presentation of additional UIs in response to a user action, or UI components may be dynamically resized in order to accommodate additional UI components.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of presenting an integrated user interface (UI), the method comprising:
    registering a plurality of separately coded UI components for an e-mail client application in a registry on a computing device, the plurality of separately coded UI components comprising a menu bar, a toolbar, a folder view, an e-mail list pane, and a message pane for the e-mail client application, wherein:
        each of the plurality of separately coded UI components for the e-mail client application is registered with at least one host UI, and
        the plurality of separately coded UI components for the e-mail client application is not compiled together as a single piece of code;
    initializing, on the computing device, a host UI comprising a window of the e-mail client application;
    analyzing the registry to determine each separately coded UI component for the e-mail client application that is registered with the host UI and is to be included in an integrated UI implemented by the window of the e-mail client application;
    creating, by the host UI, an instance of each separately coded UI component that is to be included in the integrated UI;
    interfacing, by the host UI, with each separately coded UI component that is to be included in the integrated UI; and
    presenting, by the host UI, each separately coded UI component together as the integrated UI implemented by the window of the e-mail client application.

2. The method as recited in claim 1 wherein the plurality of separately coded UI components for the e-mail client application includes a first UI component that is coded based on a first programming language and a second UI component that is coded based on a second programming language that is different than the first programming language.

3. The method as recited in claim 1 further comprising:
    registering a new separately coded UI component for the e-mail client application in the registry for implementing an enhancement to the host UI.

4. The method as recited in claim 1 further comprising:
    removing a separately coded UI component from the intergrated UI; and
    presenting the integrated UI without recompiling other separately coded UI components included in the integrated UI and without recompiling the host UI.

5. The method as recited in claim 1 further comprising:
    adding a new separately coded UI component to the integrated UI without recompiling other separately coded UI components included in the integrated UI and without recompiling the host UI.

6. The method as recited in claim 5 further comprising:
    registering the new separately coded UI component with the host UI.

7. The method as recited in claim 1 further comprising:
    changing a separately coded UI component included in the integrated UI without recompiling other separately coded UI components included in the integrated UI and without recompiling the host UI.

8. The method as recited in claim 1 further comprising:
    creating, by the host UI, an instance of a toolbar for the e-mail client application to be included in the integrated UI;
    creating, by the toolbar, an instance of a first button to be included in the toolbar;
    creating, by the toolbar, an instance of a second button to be included in the toolbar, wherein the first button and the second button are separately coded and based on different programming languages; and
    presenting, by the toolbar, the first button and the second button together as an integrated sub-UI implemented by the toolbar.

9. The method as recited in claim 2 wherein the first programming language and the second programming language are different programming languages selected from the group consisting of C++, C++ Microsoft Foundation Class, C++ non-Microsoft Foundation Class, Visual Basic, and Avalon.

10. A computing device comprising a processing unit executing computer-readable instructions stored in memory of the computing device for performing a method of presenting an integrated user interface (UI), the method comprising:
- registering a plurality of separately coded UI components for an e-mail client application in a registry on the computing device, the plurality of separately coded UI components comprising a menu bar, a toolbar, a folder view, an e-mail list pane, and a message pane for the e-mail client application, wherein:
  - each of the plurality of separately coded UI components for the e-mail client application is registered with at least one host UI,
  - the plurality of separately coded UI components for the e-mail client application is not compiled together as a single piece of code, and
  - the plurality of separately coded UI components for the e-mail client application includes a first UI component that is coded based on a first programming language and a second UI component that is coded based on a second programming language that is different than the first programming language;
- initializing a host UI comprising a window of the e-mail client application;
- analyzing the registry to determine each separately coded UI component for the e-mail client application that is registered with the host UI and is to be included in an integrated UI implemented by the window of the e-mail client application;
- creating, by the host UI, an instance of each separately coded UI component that is to be included in the integrated UI including the first UI component and the second UI component;
- interfacing, by the host UI, with each separately coded UI component that is to be included in the integrated UI including the first UI component and the second UI component; and
- presenting, by the host UI, each separately coded UI component together as the integrated UI implemented by the window of the e-mail client application.

11. The computing device as recited in claim 10 wherein the first UI component comprises a first sub-UI component and a second sub-UI component.

12. The computing device as recited in claim 11 wherein:
- the first sub-UI component and the second sub-UI component are based on different UI technologies of the first programming language, and
- the first UI component presents the first sub-UI component and the second sub-UI component to the host UI as a single integrated sub-UI.

13. The computing device as recited in claim 10 wherein:
- the host UI is configurable to request the first UI component and the second UI component to perform a string search, and
- the first UI component and the second UI component are configurable to return search results for the string search to the host UI.

14. The computing device as recited in claim 13 wherein:
- the first UI component comprises a first sub-UI component and a second sub-UI component,
- the first UI component is configurable to request the first sub-UI component and the second sub-UI component to perform the string search requested by the host UI, and
- the first sub-UI component and the second sub-UI component are configurable to return search results for the string search to the first UI component and the second UI component.

15. The computing device as recited in claim 10 wherein:
- the window of the e-mail client application comprises an e-mail composition window, and
- the first UI component comprises a message pane for the e-mail client application that is reused from another window of the e-mail client application that used the first UI component as a message preview pane.

16. A computer-readable storage medium storing computer-executable instructions that, when executed, cause a computing device to perform a method of providing an integrated user interface (UI), the method comprising:
- registering a plurality of separately coded UI components for an e-mail client application in a registry on the computing device, the plurality of separately coded UI components comprising a menu bar, a toolbar, a folder view, an e-mail list pane, and a message pane for the e-mail client application, wherein:
  - each of the plurality of separately coded UI components for the e-mail client application is registered with at least one host UI,
  - the plurality of separately coded UI components for the e-mail client application is not compiled together as a single piece of code, and
  - the plurality of separately coded UI components for the e-mail client application includes at least one UI component that is coded based on a first programming language that is different from a second programming language used to code another of the plurality of separately coded UI components;
- initializing a host UI comprising a window of the e-mail client application;
- analyzing the registry to determine each separately coded UI component for the e-mail client application that is registered with the host UI and is to be included in an integrated UI implemented by the window of the e-mail client application;
- creating, by the host UI, an instance of each separately coded UI component that is to be included in the integrated UI including the at least one UI;
- interfacing, by the host UI, with each separately coded UI component that is to be included in the integrated UI including the at least one UI component; and
- presenting, by the host UI, each separately coded UI component together as the integrated UI implemented by the window of the e-mail client application.

17. The computer-readable storage medium as recited in claim 16 further comprising computer-executable instructions for:
- enabling a user to cycle focus through items associated with UI components included in the integrated UI by performing an action.

18. The computer-readable storage medium as recited in claim 17 wherein enabling a user to cycle focus comprises:
- requesting a first UI component to cycle focus to a next item; and
- requesting a second UI component to cycle focus to the next item if the first UI component does not contain the next item.

19. The computer-readable storage medium as recited in claim 17 wherein enabling a user to cycle focus comprises:
- determining cycle-able controls of the UI components included in the integrated UI;
- creating a list of cycle-able controls; and
- cycling through the list of cycle-able controls, wherein an item associated with a current cycle-able control has focus in the integrated UI.

20. The computer-readable storage medium as recited in claim 19 wherein determining cycle-able controls of the UI components included in the integrated UI comprises:
   determining cycle-able controls corresponding to each sub-UI component of each UI component; and
   returning an array for each UI component comprising cycle-able controls corresponding to each sub-UI component.

* * * * *

UNITED STATES PATENT AND TRADEMARK OFFICE
CERTIFICATE OF CORRECTION

| | |
|---|---|
| PATENT NO. | : 7,770,121 B2 |
| APPLICATION NO. | : 11/786511 |
| DATED | : August 3, 2010 |
| INVENTOR(S) | : Manoj Jain et al. |

It is certified that error appears in the above-identified patent and that said Letters Patent is hereby corrected as shown below:

In column 10, lines 31-32, in Claim 4, delete "intergrated" and insert -- integrated --, therefor.

Signed and Sealed this
Twenty-fourth Day of May, 2011

David J. Kappos
*Director of the United States Patent and Trademark Office*